Feb. 18, 1936.　　　　E. G. KENNEBECK　　　　2,031,264
DEVICE FOR SACKING SLICED BREAD AND THE LIKE
Filed Jan. 16, 1934　　　　2 Sheets-Sheet 1
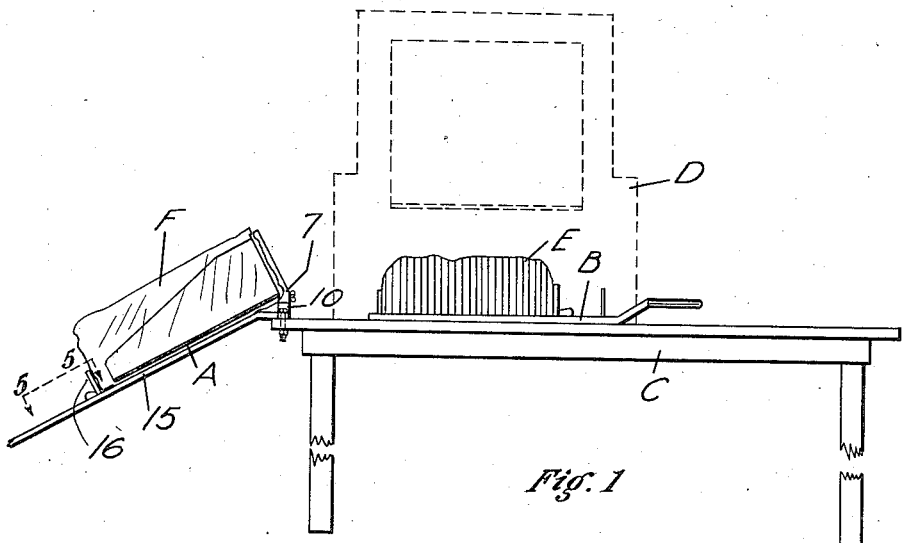
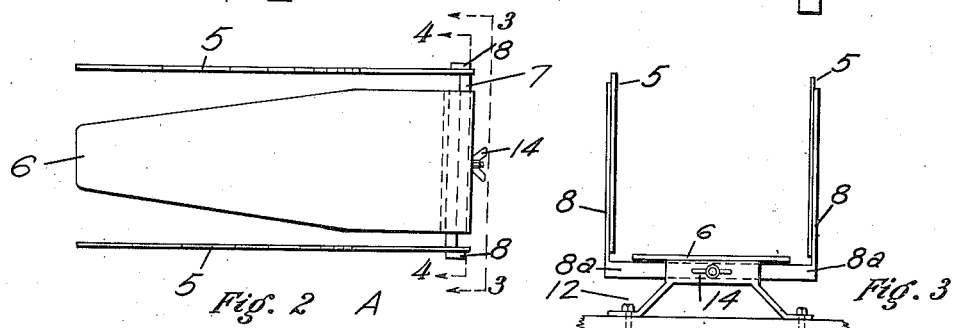
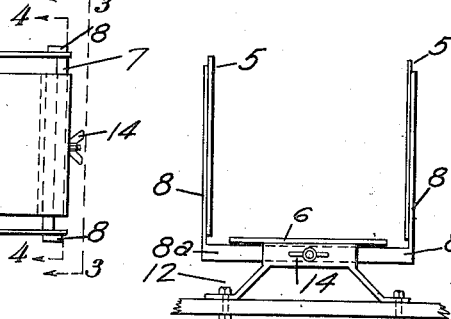
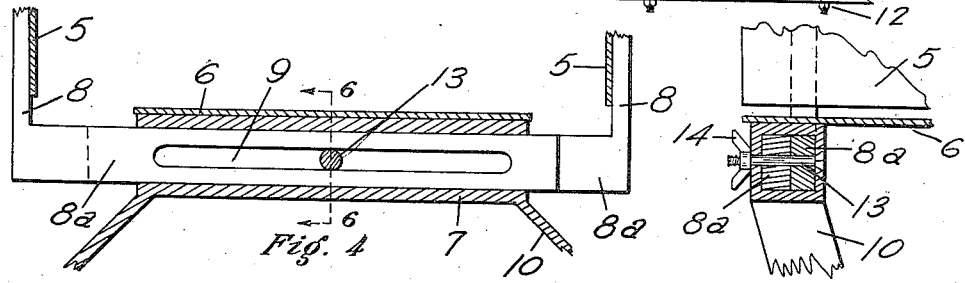
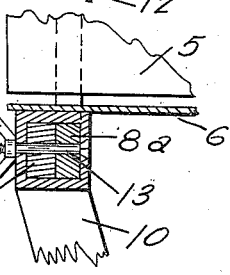
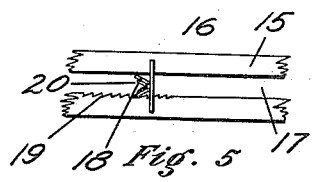
INVENTOR.
E. G. Kennebeck
BY
G. J. Rollandet
ATTORNEY.

Feb. 18, 1936.  E. G. KENNEBECK  2,031,264
DEVICE FOR SACKING SLICED BREAD AND THE LIKE
Filed Jan. 16, 1934   2 Sheets-Sheet 2
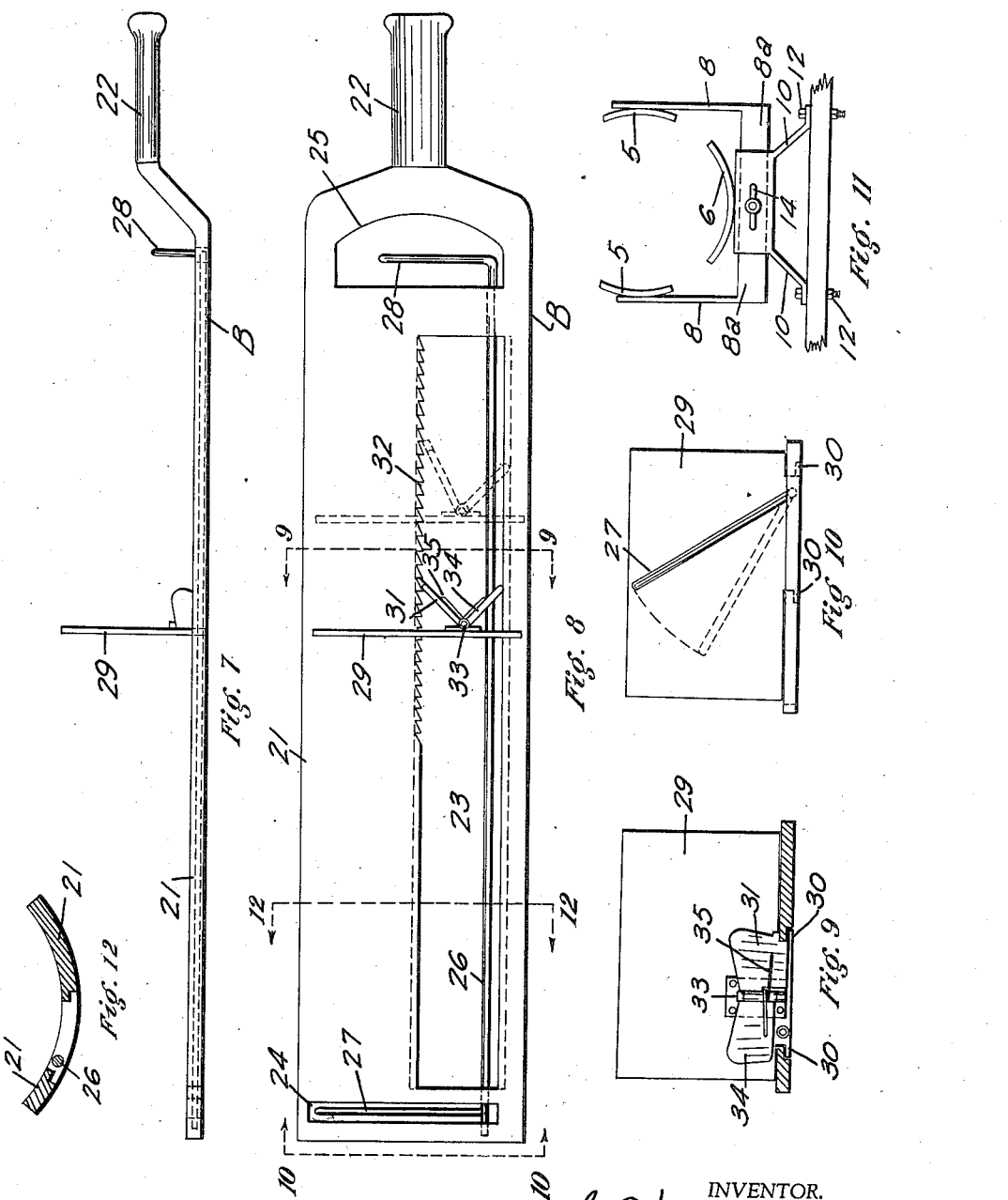
INVENTOR.
E. G. Kennebeck
BY
G. J. Rollandet
ATTORNEY.

Patented Feb. 18, 1936

2,031,264

UNITED STATES PATENT OFFICE 2,031,264

DEVICE FOR SACKING SLICED BREAD AND THE LIKE

Eugene G. Kennebeck, Denver, Colo.

Application January 16, 1934, Serial No. 706,823

3 Claims. (Cl. 226—18)

This invention relates to a device for sacking sliced bread and other similar products. Owing to the constantly increasing demand for sliced bread loaves, i. e., loaves of bread that are divided into slices of uniform thickness in the bakery by means of a slicing machine, and sold to the consumer in a bag or wrapper which holds the slices together, the necessity has arisen for a simple device to place the sliced loaves of bread, as they come from the slicing machine, into the bags or wrappers in which they are sold.

It is an object of the present invention to provide a device of the above stated character which is simple in construction and practical and efficient in use and which may be produced at a cost so low as to bring it within the reach of all bakeries, irrespective of their size.

With this object in view, the device comprises a loaf-holding element, manually operated, to insert a sliced loaf into the bag or wrapper held in an open condition by a sack or wrapper holding element.

Other objects of my invention are to be found in details of construction of the sacking device, in novel arrangements and combinations of parts comprised therein, and in the provision of adjustments which adapt the device for handling bread loaves of different sizes or for other products, such as doughnuts, buns or cookies, which are sold in quantities in a bag or wrapper, and in relative arrangement similar to that of the slices in a divided loaf of bread.

An embodiment of the invention has been shown in the accompanying drawings, in the several views of which like parts are similarly designated and in which Figure 1 represents a partially broken side elevation of the sacking device in its operative position relative to a slicing machine, Figure 2 is an underneath view of the bag-holding element of the device drawn to a larger scale, Figure 3 a front view of the same, looking in the direction of the arrows 3 in Figure 2, Figure 4 is a further enlarged section on the line 4—4 of Figure 2, Figure 5 a fragmentary view looking in the direction of the arrows 5 in Figure 1, and Figure 6 a section along the line 6—6 of Figure 4, Figure 7 is an enlarged side elevation of the bread-holding element of the device, Figure 8 a plan view of the same, Figure 9 a transverse section along the line 9—9 of Figure 8, Figure 10 an end view looking in the direction of the arrows 10 in Figure 8, Figure 11 a view similar to that of Figure 3, showing a modified construction of the bag-holding element, and Figure 12 a transverse section in the plane indicated by the line 12—12 of Figure 8, showing a modified form of the loaf-holding element.

Referring first to Figure 1 of the drawings, the bag- or wrapper-holding element A and the loaf-holding element B are assembled upon a suitable support, such as a table C, in operative adjacency to a slicing machine shown in broken lines as at D. It will be understood that the slicing machine is not a part of the present invention and may be of any conventional character or construction.

The sliced loaf of bread has been indicated at E, and the bag or wrapper into which the loaf is to be inserted at F.

As stated hereinbefore, the device is adapted for wrapping or sacking doughnuts, buns or other similar bakery products loosely placed together, as well as for sliced loaves of bread, and it is to be understood that in the following description and claims, the use of the term "loaf" includes all pluralities of all products capable of being handled and sacked by the use of the present device. Also in referring to a bag, any receptacle of similar nature, either in the form of a previously formed bag or wrapper folded to provide a bag, is included.

The bag-holding element A comprises three blades 5 and 6 fastened at one of their ends to a head 7 which is fastened to the support C in the downwardly slanting position.

The three blades taper toward the free ends, and being placed at substantially right angles to each other, hold the bag F into which they are inserted in an open position, to receive the loaf E through the intermediary of the element B. The head is composed of two angular members 8, the lower arms 8a of which are slotted as at 9 and placed in lapping relation side by side for the adjustment of the distance between the side blades 5 which are fastened to the other arms of the members.

The head includes a slotted chair 10 which is fastened upon the support C as by means of screws or bolts 12 and which carries the bottom blade 6 of the element.

The arms 8a of the members fit conjointly in the slot of the chair for relatively sliding movement and they are secured in adjusted positions by a bolt 13 and a wing nut 14, the former of which is held in alined holes of the chair and passes freely through the slots of the arms.

It will be seen that by these means the element may be adapted to hold bags of different dimensions.

Beneath the parts of the element thus described is a plate 15 spaced from the bottom blade 6, upon which the bag is supported. A rest 16 for the end of the bag extends at right angles to the plate, and in order to adapt the element for holding bags of different lengths, this rest is adjustable lengthwise of the plate. The latter has to this end a longitudinal slot as shown at 17 in Figure 5, and the rest, which is loosely supported upon the plate, carries a hand-operated detent 18 which by engagement with a series of ratchet-teeth 19 at one side of the slot holds the rest in its adjusted position. A spring 20 holds the detent in engagement with the teeth and generally is of a construction similar to that of the detent of the loaf-holding element, hereinafter to be described.

The loaf-holding element comprises a slab 21 having at one end an offset handle 22 to facilitate its manipulation and having at opposite ends of a longitudinal slot 23 two transverse openings 24 and 25. A rod-like shaft 26 is mounted for rotation in alined openings of the parts of the slab between its longitudinal slot and its transverse openings, and it carries at opposite ends an arm 27 adapted to occupy the opening 24 and a handle 28 movable inside the opening 25 which is adjacent the handle 22 of the slab.

A follower 29 extends at right angles to the upper surface of the slab and through the slot 23 of the same, and it has at its lower edge flanges 30 which are movably fitted in rabbets at opposite sides of the slot on the under side of the slab.

The shaft 26 extends loosely through an aperture in the part of the follower inside the slot.

The follower carries a detent 31 adapted to engage with a rack of ratchet-teeth 32 at an edge of the slot 23 and pivotally mounted as at 33 on a thumb-piece 34 which is rigidly fastened to the detent. A spring 35, disposed between this thumb-piece and the relatively movable detent, holds the latter in engagement with the ratchet-teeth.

Normally, the arm 27 of the shaft extends inside the opening 24 of the slab beneath the upper surface of the same, while the handle 28 of the shaft extends slantingly above said surface. In the operation of the device the sliced loaf E delivered from the slicing machine is placed upon the slab after the arm 27 has been raised by manipulation of the handle 28 to provide a stop for engagement with an end of the loaf, as indicated in Figure 10 of the drawings.

The follower 29, which previously had been placed adjacent the opposite end of the slab, is now moved to engage the corresponding end of the loaf whereby to confine the same between the follower and the raised arm on the shaft. When the loaf is thus confined, the detent 31, which was disengaged from the ratchet-teeth to permit of adjustment of the follower, is now released to secure the follower in its adjusted position. The element B is now lifted from the support and inserted into the mouth of the bag held open by the element A, to place the loaf within the bag, after which the shaft 26 is again rotated by means of its handle to withdraw the arm into the opening 24 of the slab, whereby to permit of the loaf holder being withdrawn from the bag, leaving the loaf within the same.

The bag with the loaf inside the same is subsequently removed from the holding element A, after which the end of the bag is closed and sealed. Another bag is then placed around the blades of the element, ready to receive another loaf moved from the slicing machine onto the element B and secured between the raised arm 27 of the shaft and the adjusted follower.

It will be apparent that changes in the construction and arrangement of the elements of the device and the parts comprised in the elements may be made without departing from the scope of the invention. For example, when the device is used for sacking doughnuts, buns or other similar products of rounded form, both the slab 21 of the loaf-holding element and the blades 5 and 6 of the bag-holding element may be rounded as shown in Figures 11 and 12, respectively.

What I claim and desire to secure by Letters Patent is:

1. A sacking device comprising a slab for the support of a series of articles to be sacked, a rotary shaft on the slab, a stop, normally beneath the surface of the slab and movable by rotation of the shaft for engagement with an end of the series, and a follower on the slab to engage the opposite end of the series.

2. A sacking device comprising a slab for the support of a series of articles to be sacked, a rotary shaft on the slab, having an arm, normally beneath the surface of the slab and movable by rotation of the shaft to provide a stop for engagement with an end of the series, and a follower on the slab to engage the opposite end of the series.

3. A sacking device comprising a slab for the support of a series of articles to be sacked, having a slot and a series of teeth at an edge thereof, and having an opening at an end of the slot, a rotary shaft on the slab having an arm normally occupying the opening and movable outside the same by rotation of the shaft to provide a stop for engagement with an end of the series, a follower movable in the slot to engage the opposite end of the series, and a detent on the follower cooperating with the series of teeth to hold the follower in adjusted positions.

EUGENE G. KENNEBECK.